(12) United States Patent
Janoff

(10) Patent No.: US 6,746,761 B2
(45) Date of Patent: Jun. 8, 2004

(54) HIGH TEMPERATURE SILICONE BASED SUBSEA INSULATION

(75) Inventor: Dwight D. Janoff, Missouri City, TX (US)

(73) Assignee: FMC Technologies, Inc., Chicago, IL (US)

( * ) Notice: Subject to any disclaimer, the term of this patent is extended or adjusted under 35 U.S.C. 154(b) by 0 days.

(21) Appl. No.: 10/185,881

(22) Filed: Jun. 27, 2002

(65) Prior Publication Data

US 2003/0012967 A1 Jan. 16, 2003

Related U.S. Application Data

(60) Provisional application No. 60/302,926, filed on Jul. 3, 2001.

(51) Int. Cl.$^7$ ............................................... E21B 33/14
(52) U.S. Cl. ...................... 428/327; 166/368; 166/57; 166/350; 523/212; 523/214; 524/588
(58) Field of Search ................. 523/212, 214; 524/888; 428/327; 166/368, 57, 350

(56) References Cited

U.S. PATENT DOCUMENTS

| | | | |
|---|---|---|---|
| 3,722,591 A | | 3/1973 | Maxson |
| 3,742,985 A | | 7/1973 | Rubenstein |
| 4,061,579 A | | 12/1977 | Sawko et al. |
| 4,348,243 A | | 9/1982 | Craubner |
| 4,595,714 A | | 6/1986 | McAllister et al. |
| 4,598,106 A | * | 7/1986 | Utsugi ........................ 523/218 |
| 5,582,249 A | | 12/1996 | Caveny et al. |
| 5,712,038 A | | 1/1998 | Yamazaki et al. |
| 5,981,610 A | * | 11/1999 | Meguriya et al. ............. 521/54 |
| 6,153,294 A | * | 11/2000 | Patton et al. ............. 428/312.8 |
| 6,196,316 B1 | * | 3/2001 | Bosma et al. ................. 166/294 |
| 6,284,809 B1 | | 9/2001 | Plummer et al. |
| 6,365,268 B1 | * | 4/2002 | Williams et al. ............. 428/327 |
| 6,520,261 B1 | * | 2/2003 | Janoff et al. ................. 166/350 |

FOREIGN PATENT DOCUMENTS

| | | |
|---|---|---|
| EP | 1 070 906 A1 | 1/2001 |
| WO | WO 94/29634 A1 | 12/1994 |

* cited by examiner

Primary Examiner—Margaret G. Moore
(74) Attorney, Agent, or Firm—Henry C. Query, Jr.

(57) ABSTRACT

The invention is an insulation material which comprises a silicon based matrix and a plurality of non-metallic beads supported in the matrix. In one embodiment of the invention, the matrix comprises a platinum cured, addition cured silicon material and the beads comprise a mean diameter of less than about 60 microns and an isostatic strength of at least about 10,000 psi. The insulation material may be used in conjunction with subsea oil and gas production equipment, such as pipelines, wellheads and christmas trees.

6 Claims, 1 Drawing Sheet

FIG. 1
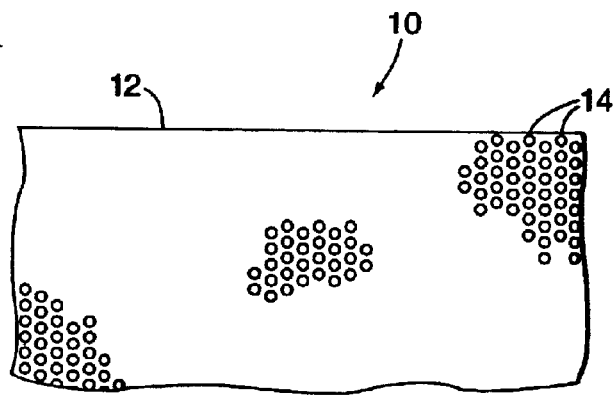
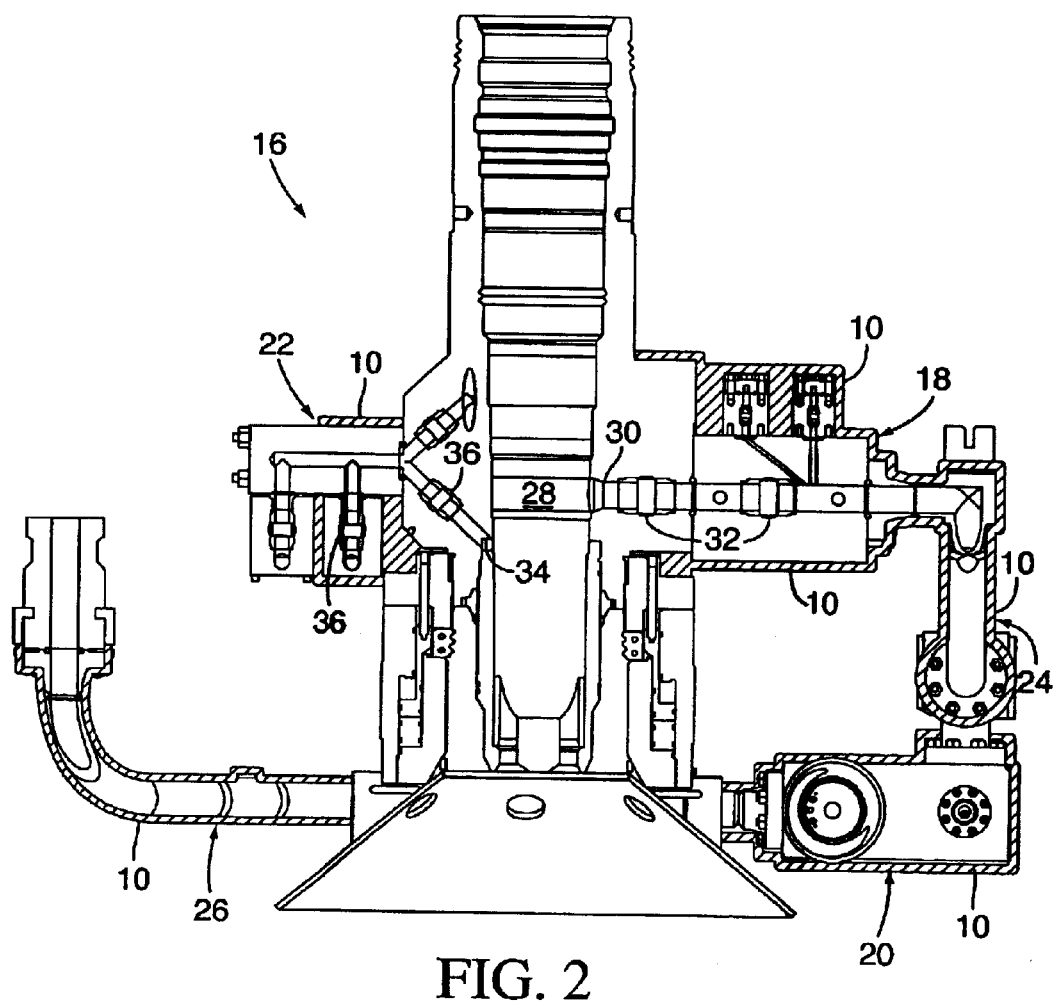
FIG. 2

HIGH TEMPERATURE SILICONE BASED SUBSEA INSULATION

This application is based on U.S. Provisional Patent Application No. 60/302,926, which was filed on Jul. 3, 2001.

BACKGROUND OF THE INVENTION

The present invention is related to an insulation material for use on subsea oil and gas production equipment.

When subsea oil and gas wells are located at depths of 5,000 feet or more, the pipelines and wellhead equipment are exposed to seawater which is just a few degrees above freezing. This same temperature can exist in shallow water at extreme latitudes, such as in the North Sea. During a temporary well shutdown, hot produced fluids within the production equipment become stagnant and are cooled by the surrounding seawater. If the stagnant fluids approach the seawater temperature, hydrates can form in the equipment and block the flow of the fluid.

Thermal insulation is sometimes installed around subsea pipelines and wellhead equipment to slow the cooling process and delay hydrate formation until flow can be restored. To perform successfully in this environment, a thermal insulation material must have a low thermal conductivity, exhibit acceptable mechanical properties such as flexibility and impact resistance, and be economical to install.

In many subsea wells, especially those in deep water, the insulation requirements are further complicated by the extreme temperatures of the hydrocarbon fluids exiting the well. In some cases the temperature of the exiting fluids may reach 300° F. or higher, and the fluids will consequently heat both the surrounding equipment and the insulation. Therefore, any insulation material which is used on such wells must be able to withstand these extreme temperatures without detriment to its thermal or mechanical properties.

Although insulation materials exist which can withstand these relatively high temperatures, they are inherently brittle. Therefore, these materials are unable to meet the flexibility and impact resistance requirements of many applications. Examples of these types of prior art insulation materials include syntactic phenolic foams and high temperature epoxy resins. Furthermore, because of their brittle nature and exothermic curing properties, these materials are difficult and expensive to install and repair.

Conversely, existing insulation materials which exhibit acceptable flexibility and impact resistance characteristics are unable to withstand the relatively high flow temperatures present in may deep water wells. Examples of these types of prior art materials include amine cured epoxies, urethanes, and polypropylenes.

SUMMARY OF THE INVENTION

In accordance with the present invention, these and other disadvantages in the prior art are overcome by providing a thermal insulation material which comprises a silicone matrix and a plurality of non-metallic beads which are supported in the matrix. In one embodiment of the invention, the matrix comprises Silastic® E RTV silicone rubber, which is a platinum cured, addition cured silicone material. In addition, the non-metallic beads comprise hollow glass beads which have a mean diameter of less than about 60 microns and an isostatic strength of at least about 10,000 psi.

The thermal insulation material of the present invention exhibits many advantageous properties which make it particularly suitable for use on subsea oil and gas production equipment. The matrix material is highly flexible, which makes the insulation material resistant to cracking under thermal and mechanical stresses. In addition, since the matrix material produces no by-products or exothermic effects during curing, the insulation material can be cast-in-place in thick sections. Furthermore, due to its relatively low thermal conductivity, the insulation material is an excellent insulator. Moreover, the insulation material can withstand extreme temperatures in excess of 300° F. without detriment to its thermal or mechanical properties.

These and other objects and advantages of the present invention will be made apparent from the following detailed description, with reference to the accompanying drawings.

BRIEF DESCRIPTION OF THE DRAWINGS

FIG. 1 is a cross sectional view of the thermal insulation material of the present invention; and FIG. 2 is a cross sectional view of an exemplary subsea christmas tree having the thermal insulation material of the present invention applied thereto.

DETAILED DESCRIPTION OF THE PREFERRED EMBODIMENTS

The present invention is an insulation material which is suitable for subsea oil and gas production equipment. Referring to FIG. 1, the insulation material, which is indicated generally by reference number 10, comprises a matrix 12 and a plurality of micro beads 14 which are supported in the matrix. The matrix 12 ideally comprises a suitable silicone material. More preferably, the matrix 12 comprises an addition cured silicone material. In accordance with one embodiment of the present invention, the matrix 12 comprises a platinum cured, addition cured silicone material, such as the Silastic® E RTV silicone rubber product which is available from Dow Corning Corporation.

In the context of the present invention, addition cured silicones are preferred over condensation cured silicones because they produce no byproducts or exothermic effects during curing and are therefore more suitable for casting in thick sections. In contrast, condensation cured silicones require moisture from the air in order to cure properly and produce byproducts during curing, making them unsuitable for casting in thick sections. However, the matrix 12 could comprise any suitable silicone material, including any other addition cured silicone material. Moreover, the matrix 12 could comprise a condensation cured silicone material if the material is cast in relatively thin sections.

The addition of the micro beads 14 to the matrix 12 reduces the density and the thermal conductivity of the insulation material 10. The micro beads 14 are preferably hollow, preferably glass beads having a mean diameter of up to about 60 microns. In order to withstand the hydrostatic pressure of a deep sea environment, the beads preferably have an isostatic strength of at least approximately 10,000 psi. Suitable micro beads for use in the present invention include Scotchlite™ H50/10,000 EPX Floated Series Glass Bubbles, which are available from 3M Corporation. These micro beads comprise an epoxy silane surface treatment which helps the beads adhere to the silicone matrix 12. While glass micro beads 14 are preferred, the micro beads could be made of any suitable material, such as a ceramic or polymer. Moreover, in shallower waters less expensive beads with a lower isostatic strength may be used.

The insulation material 10 should include as large a quantity of the micro beads 14 as possible to facilitate effective thermal insulation while maintaining the brittleness of the insulation material below maximum acceptable levels. Thus, the insulation material 10 should include about 50–95% by volume of the matrix 12 and about 5–50% by volume of the micro beads 14. Preferably, the insulation material 10 should include about 65–95% by volume of the matrix 12 and about 5–35% by volume of the micro beads 14. More preferably, the insulation material comprises about 75–85% by volume of the matrix 12 and about 15–25% by volume of the micro beads 14. In one embodiment of the invention, an acceptable insulation material 10 was achieved by mixing 80% by volume of the matrix 12 with 20% by volume of the micro beads 14. It should be noted that micro beads 14 of two or more mean diameters may be combined in order to achieve a larger concentration of the micro beads in the insulation material 10.

In accordance with the present invention, an exemplary insulation material 10 may be obtained by mixing the following constituent substances in any order:

4 parts by volume of Silastic® E RTV silicone rubber; and
1 part by volume of Scotchlite™ H50/10,000 EPX Floated Series Glass Bubbles.

Listed below are the relevant thermal and mechanical properties of this insulation material 10. All of these properties are within acceptable limits for the intended applications of the present invention.

| Property | Value |
| --- | --- |
| Hardness | 45–55 Shore A |
| Tensile Elongation | up to 100% |
| Thermal Conductivity | 0.08 BTU/(hr · ft · ° F.) |
| Density | 0.95 to 1.10 g/cc |

The insulation material 10 of the present invention can be used to thermally insulate any object from a surrounding fluid. In accordance with one embodiment of the invention, the insulation material 10 is used to insulate undersea pipes and wellhead equipment from seawater.

Referring to FIG. 2, for example, the insulation material 10 is shown applied to certain portions of a subsea christmas tree 16. The subsea christmas tree with which the present invention may be used can be of any known type of subsea christmas tree, including the so-called horizontal and conventional christmas trees. Such trees typically include an axial production bore 28 in communication with the well bore, a production outlet 30 connected to the production bore, one or more production valves 32 for controlling flow through the production outlet 30, a choke 20 connected to the production outlet 30 via a flow loop 24, an annulus outlet 34 connected to the tubing annulus surrounding the production tubing (not shown), one or more annulus valves 36 for controlling flow through the annulus outlet 34, and a production flow loop 26 for connecting the production outlet with an undersea pipe (not shown).

Ideally, the insulation material 10 is applied to those portions of the christmas tree 16 which are most exposed to the surrounding seawater and through which the produced fluids will flow. For example, in FIG. 2 the insulation material 10 is shown applied to the production valve block 18 which houses one or more of the production valves 32, the choke 20, the annulus valve block 22 which houses one or more of the annulus valves 36, and the flow loops 24 and 26. Of course, the insulation material 10 may be applied to additional or fewer components of the subsea christmas tree 16 as desired or required under particular circumstances.

The thickness of the insulation material 10 in the direction of heat transfer is preferably between about 0.5" and 5", and more preferably between about 2" and 4". However, the thickness of the insulation material 10 may vary depending on the environment and the geometry of the surface to be insulated.

The insulation material 10 can be installed using a variety of methods. In the preferred method, a form or mold is constructed around the object to be insulated. The material is then cast between the object and the mold and allowed to cure. Once the material has cured, the mold is removed. Alternatively, the insulation material can be pre-cast into sections which are shaped to complement the object to be insulated. Once the pre-cast sections have cured, they may be secured to the object using adhesives, mechanical fasteners, or any other suitable means. The insulation material can also be sprayed onto the object using a spray nozzle or similar device.

In accordance with an alternative embodiment of the invention, the micro beads 14 can be omitted from the insulation material 10. Although the thermal conductivity and density of this embodiment are inferior to the preferred embodiment, this alternative embodiment exhibits superior flexibility characteristics which may be suitable for certain applications.

In accordance with another embodiment of the invention, the insulation material comprises a base layer and an outer coating overlaying the base layer. The base layer is preferably the insulation material 10 described above. The outer coating preferably exhibits a higher hardness and density than the insulation material 10, thus providing a protective layer for the base layer.

It should be recognized that, while the present invention has been described in relation to the preferred embodiments thereof, those skilled in the art may develop a wide variation of structural and operational details without departing from the principles of the invention. Therefore, the appended claims are to be construed to cover all equivalents falling within the true scope and spirit of the invention.

What is claimed is:

1. A subsea christmas tree comprising:

a production bore;

a production outlet connected to the production bore;

a flow loop in communication with the production outlet; and a thermal insulation material surrounding at least a portion of the flow loop;

said thermal insulation material comprising a silicone matrix and a plurality of non-metallic beads which are suspended directly in said matrix.

2. The subsea christmas tree of claim 1, wherein said matrix comprises an addition cured silicone material.

3. The subsea christmas tree of claim 1, wherein said matrix comprises a platinum cured, addition cured silicone material.

4. The subsea christmas tree of claim 1, wherein said beads comprise hollow glass beads.

5. The subsea christmas tree of claim 4, wherein said beads comprise a mean diameter of loss than about 60 microns and an isostatic strength of at least about 10,000 psi.

6. The subsea christmas tree of claim 4, wherein said beads comprise an epoxy silane surface treatment.

* * * * *